US012535842B2

(12) United States Patent
Chang

(10) Patent No.: US 12,535,842 B2
(45) Date of Patent: Jan. 27, 2026

(54) REGULATOR AND OPERATION METHOD THEREOF

(71) Applicant: eMemory Technology Inc., Hsinchu (TW)

(72) Inventor: Che-Wei Chang, Hsinchu County (TW)

(73) Assignee: eMemory Technology Inc., Hsinchu (TW)

( * ) Notice: Subject to any disclaimer, the term of this patent is extended or adjusted under 35 U.S.C. 154(b) by 310 days.

(21) Appl. No.: 18/361,900

(22) Filed: Jul. 30, 2023

(65) Prior Publication Data

US 2024/0160238 A1 May 16, 2024

Related U.S. Application Data

(60) Provisional application No. 63/424,966, filed on Nov. 14, 2022.

(51) Int. Cl.

| | |
|---|---|
| ***G05F 1/575*** | (2006.01) |
| ***G05F 1/46*** | (2006.01) |
| *G05F 1/563* | (2006.01) |
| *G05F 1/565* | (2006.01) |
| *G05F 3/20* | (2006.01) |

(52) U.S. Cl.

CPC .............. *G05F 1/575* (2013.01); *G05F 1/467* (2013.01); *G05F 1/563* (2013.01); *G05F 1/565* (2013.01); *G05F 3/205* (2013.01)

(58) Field of Classification Search

CPC .......... G05F 1/462; G05F 1/467; G05F 1/563; G05F 1/565; G05F 1/575; G05F 3/205; G11C 5/145–147

See application file for complete search history.

(56) References Cited

U.S. PATENT DOCUMENTS

| | | | | |
|---|---|---|---|---|
| 8,598,854 | B2 | 12/2013 | Soenen et al. | |
| 10,423,178 | B1 * | 9/2019 | Chen | G05F 1/56 |
| 2009/0273237 | A1 * | 11/2009 | Inoue | G05F 1/575 323/281 |

(Continued)

FOREIGN PATENT DOCUMENTS

| | | | |
|---|---|---|---|
| CN | 104426360 | A | 3/2015 |
| CN | 110968146 | A | 4/2020 |

(Continued)

OTHER PUBLICATIONS

Giustolisi et al., "NMOS Low Drop-Out Regulator with Dynamic Biasing," 2006 13th IEEE International Conference on Electronics, Circuits and Systems, Nice, France, 2006, pp. 204-207, doi: 10.1109/ICECS.2006.379761. (Year: 2006).*

*Primary Examiner* — Fred E Finch, III

(74) *Attorney, Agent, or Firm* — CKC & Partners Co., LLC

(57) ABSTRACT

A regulator includes a pre-regulator circuit, a pump circuit, an output stage circuit, and a tracking circuit. The pre-regulator circuit is configured to generate a pre-regulated voltage according to a power voltage. The pump circuit is configured to generate a pumped voltage according to the pre-regulated voltage and a tracking voltage. The output stage circuit is configured to generate an output voltage according to the pumped voltage and the power voltage. The tracking circuit is configured to track the output stage circuit to generate the tracking voltage and transmit the tracking voltage to the pump circuit.

16 Claims, 4 Drawing Sheets

(56) References Cited

U.S. PATENT DOCUMENTS

| | | | | |
|---|---|---|---|---|
| 2013/0234684 | A1* | 9/2013 | Chang | G05F 1/575 323/281 |
| 2014/0084896 | A1* | 3/2014 | Zhang | G05F 1/575 323/311 |
| 2014/0312710 | A1 | 10/2014 | Li | |

FOREIGN PATENT DOCUMENTS

| | | | |
|---|---|---|---|
| CN | 111474979 | A | 7/2020 |
| JP | 3119205 | B2 | 12/2000 |
| TW | 201630321 | A | 8/2016 |
| TW | 202034110 | A | 9/2020 |
| TW | 202037059 | A | 10/2020 |
| TW | 202046616 | A | 12/2020 |

* cited by examiner

400

REGULATOR AND OPERATION METHOD THEREOF

RELATED APPLICATIONS

This application claims priority to U.S. Provisional Application Ser. No. 63/424,966, filed Nov. 14, 2022, which is herein incorporated by reference.

BACKGROUND

Technical Field

The present disclosure relates to regulator technology. More particularly, the present disclosure relates to a regulator introducing smaller ripple and an operation method thereof.

Description of Related Art

With developments of technology, various regulators are developed. In some related approaches, in a regulator, a charge pump is added between a power voltage and an operational amplifier for locking an output voltage more accurately. However, this method introduces larger ripple.

SUMMARY

Some aspects of the present disclosure are to a regulator. The regulator includes a pre-regulator circuit, a pump circuit, an output stage circuit, and a tracking circuit. The pre-regulator circuit is configured to generate a pre-regulated voltage according to a power voltage. The pump circuit is configured to generate a pumped voltage according to the pre-regulated voltage and a tracking voltage. The output stage circuit is configured to generate an output voltage according to the pumped voltage and the power voltage. The tracking circuit is configured to track the output stage circuit to generate the tracking voltage and transmit the tracking voltage to the pump circuit.

Some aspects of the present disclosure are to provide an operation method of a regulator. The operation method includes following operations: generating, by a pre-regulator circuit, a pre-regulated voltage according to a power voltage; tracking, by a tracking circuit, to generate a tracking voltage; transmitting, by the tracking circuit, the tracking voltage to a pump circuit; generating, by the pump circuit, a pumped voltage according to the pre-regulated voltage and a tracking voltage; and generating, by an output stage circuit, an output voltage according to the pumped voltage and the power voltage.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
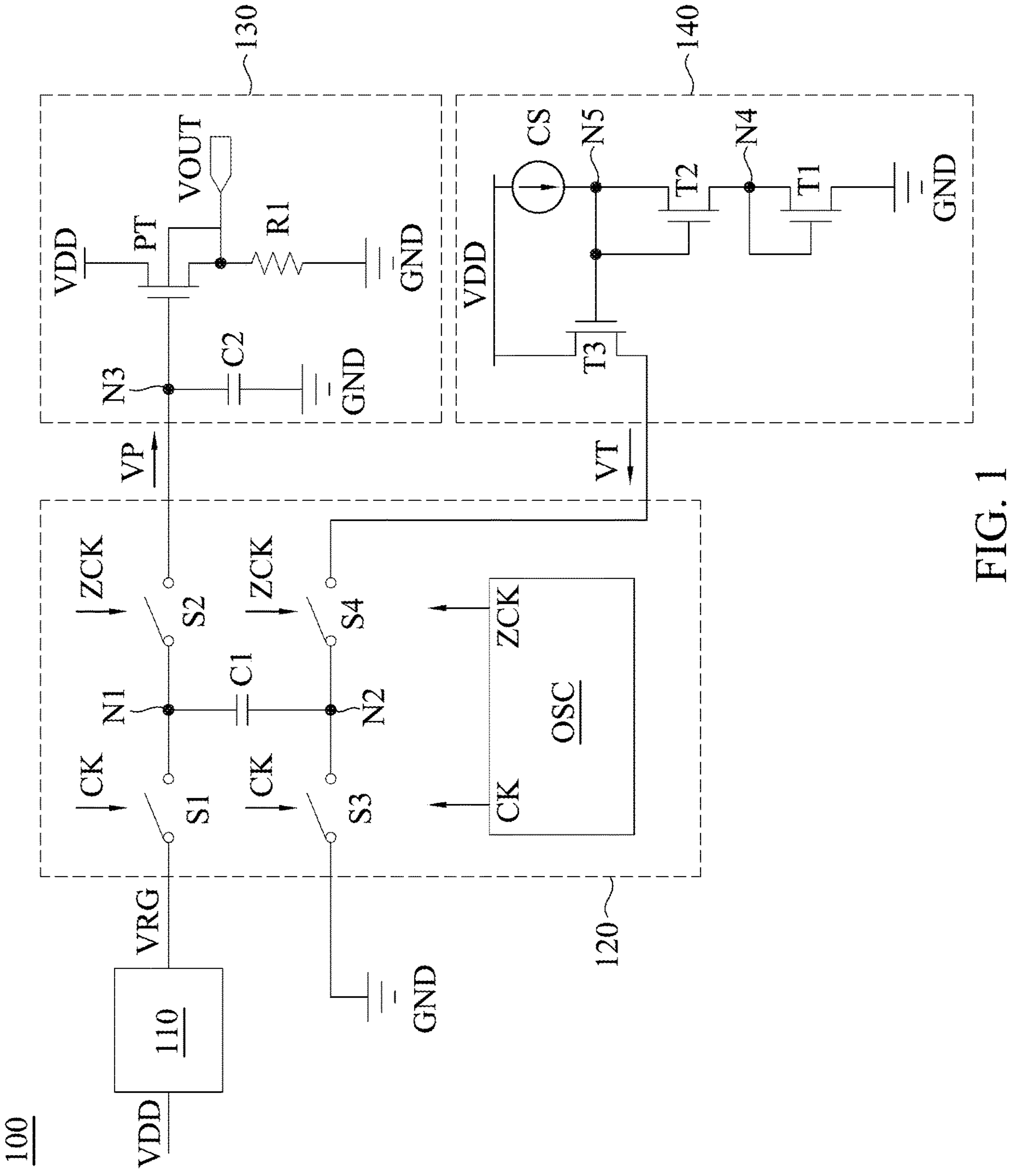
FIG. 1 is a schematic diagram illustrating a regulator according to some embodiments of the present disclosure.

Reference is made to FIG. 1. FIG. 1 is a schematic diagram illustrating a regulator 100 according to some embodiments of the present disclosure.

As illustrated in FIG. 1, the regulator 100 includes a pre-regulator circuit 110, a pump circuit 120, an output stage circuit 130, and a tracking circuit 140. The pump circuit 120 is coupled to the pre-regulator circuit 110, the output stage circuit 130, and the tracking circuit 140.

The pre-regulator circuit 110 is configured to generate a pre-regulated voltage VRG according to a power voltage VDD. In some embodiments, the pre-regulator circuit 110 can be implemented by a buck converter. In some embodiments, the pre-regulated voltage VRG (e.g., 1.8V) is lower than the power voltage VDD (e.g., 3.3V). In other words, since the power voltage VDD is inaccurate, the pre-regulator circuit 110 is configured to transfer the power voltage VDD to a lower but more accurate voltage (i.e., the pre-regulated voltage VRG), and output the lower and more accurate pre-regulated voltage VRG to the pump circuit 120 for further process, which will be described later.

The pump circuit 120 is configured to generate a pumped voltage VP according to the pre-regulated voltage VRG and a tracking voltage VT from the tracking circuit 140. In some embodiments, pumped voltage VP is substantially equal to a voltage sum of the pre-regulated voltage VRG and the tracking voltage VT. In other words, the pump circuit 120 can pump the pumped voltage VP to a relatively higher voltage higher than the pre-regulated voltage VRG. Then, the pump circuit 120 can transmit the pumped voltage VP to the output stage circuit 130 to control a power transistor PT in the output stage circuit 130.

As illustrated in FIG. 1, the pump circuit 120 includes a switch S1, a switch S2, a switch S3, a switch S4, a capacitor C1, and an oscillator OSC. The switch S1 and the switch S2 are coupled in series at a node N1 between the pre-regulator circuit 110 and the output stage circuit 130. The switch S1 is configured to receive the pre-regulated voltage VRG. The switch S2 is configured to output the pumped voltage VP. The switch S3 and the switch S4 are coupled in series at a node N2 between a ground terminal GND and the tracking circuit 140. The switch S3 is directly coupled to the ground terminal GND. The switch S4 is configured to receive the tracking voltage VT. The capacitor C1 is coupled between the node N1 and the node N2. The oscillator OSC is configured to output a clock signal CK and an inversion clock signal ZCK to control the switches S1-S4. For example, the oscillator OSC transmits the clock signal CK to the switch S1 and the switch S3 to turn on or turn off the switch S1 and the switch S3. The oscillator OSC transmits the inversion clock signal ZCK to the switch S2 and the switch S4 to turn on or turn off the switch S2 and the switch S4.

In some embodiments, the oscillator OSC can be implemented by various circuits with oscillating functions. For example, the oscillator OSC can be implemented by an oscillating circuit.

The output stage circuit 130 is configured to generate an output voltage VOUT (e.g., 1.8V) according to the pumped voltage VP, the tracking voltage VT and the power voltage VDD. Then, the output stage circuit 130 can transmit the output voltage VOUT to other circuits to supply power to these circuits.

As illustrated in FIG. 1, the output stage circuit 130 includes the power transistor PT, a resistor R1, and a capacitor C2. In some embodiments, the power transistor PT is implemented by a N-type transistor. In some other embodiments, the power transistor PT can be implemented by multiple N-type transistors in same size. A first terminal of the power transistor PT is configured to receive the power voltage VDD. A second terminal of the power transistor PT is coupled to a first terminal of the resistor R1. A bulk terminal of the power transistor PT is coupled to the second terminal of the power transistor PT. A second terminal of the resistor R1 is coupled to the ground terminal GND. A control terminal of the power transistor PT and a first terminal of the capacitor C2 are coupled at a node N3. A second terminal of the capacitor C2 is coupled to the ground terminal GND. The capacitor C2 is configured to stabilize the voltage at the node N3. The pumped voltage VP is transmitted from the pump circuit 120 to the control terminal of the power transistor PT to control a turned-on degree of the power transistor PT so as to control the output voltage VOUT.

In some embodiments, the output stage circuit 130 is implemented by a source follower with smaller output impedance, which reduces variation of the output voltage VOUT when the load changes. As such, the transient response of the regulator 100 can be improved.

The tracking circuit 140 is configured to track the output stage circuit 130 to generate a tracking voltage VT. In some embodiments, the tracking circuit 140 can track a threshold voltage of the power transistor PT to generate the tracking voltage VT. In other words, the tracking voltage VT is substantially equal to the threshold voltage of the power transistor PT.

As illustrated in FIG. 1, the tracking circuit 140 includes a current source CS, a transistor T1, a transistor T2, and a transistor T3. In some embodiments, each of the transistors T1-T3 is implemented by a N-type transistor. The current source CS is controlled by the power voltage VDD. A first terminal of the transistor T1 is coupled to the ground GND. A control terminal of the transistor T1, a second terminal of the transistor T1, and a first terminal of the transistor T2 are coupled at a node N4. A control terminal of the transistor T2, a second terminal the transistor T2, the current source CS, and a control terminal of the transistor T3 are coupled at a node N5. In other words, the transistor T1 and the transistor T2 are in a diode-connected form and the transistor T2 is coupled between the transistor T1 and the current source CS. A first terminal of the transistor T3 is configured to receive the power voltage VDD. A second terminal of the transistor T3 is coupled to the switch S4 in the pump circuit 120 to transmit the tracking voltage VT to the switch S4. The transistor T3 is controlled by a node voltage at the node N5 between the transistor T2 and the current source CS.

In some embodiments, a size of the power transistor PT is substantially equal to a size of the transistor T1, in other words, the threshold voltage of the power transistor PT is substantially equal to the threshold voltage of the transistor T1. Thus, the transistor T1 can track the threshold voltage of the power transistor PT, and the node voltage at the node N5 is substantially equal to a sum of the threshold voltage of the transistor T2 and the power transistor PT. In some embodiments, a size of the transistor T3 is substantially equal to a size of the transistor T2. Thus, the tracking voltage VT at the second terminal of the transistor T3 equals to the threshold voltage of the power transistor PT. It is noted that the aforementioned size of one transistor represents a ratio of the gate width and the gate length of the transistor.

Figure 2:
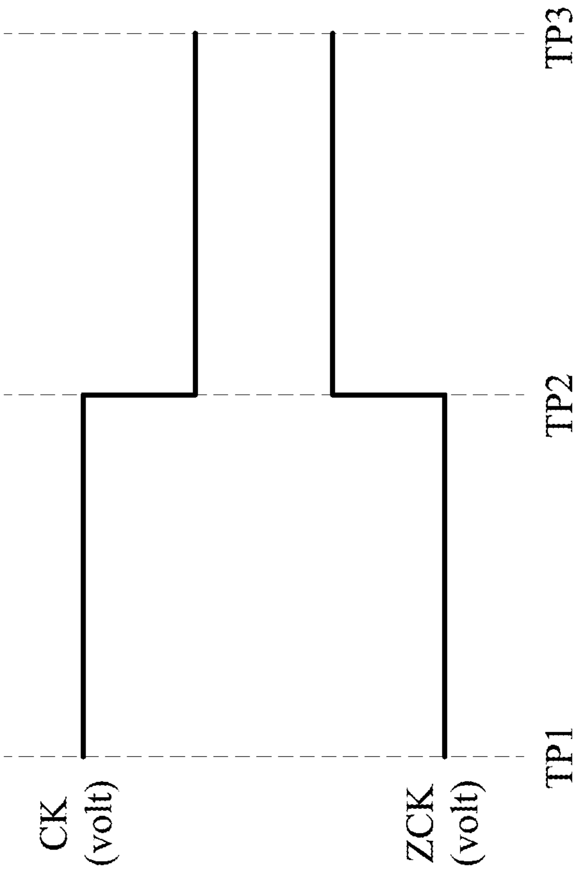
FIG. 2 is a schematic diagram illustrating waveforms of a clock signal and an inversion clock signal in FIG. 1 according to some embodiments of the present disclosure.

References are made to FIG. 1 and FIG. 2. FIG. 2 is a schematic diagram illustrating waveforms of the clock signal CK and the inversion clock signal ZCK in FIG. 1 according to some embodiments of the present disclosure.

As illustrated in FIG. 2, during a time point TP1 to a time point TP2 (e.g., a first phase), the clock signal CK has a relatively high logic value (e.g., a logic value 1) and the inversion clock signal ZCK has a relatively low logic value (e.g., a logic value 0). The switch S1 and the switch S3 are turned on based on the clock signal CK with the relatively high logic value, and the switch S2 and the switch S4 are turned off based on the inversion clock signal ZCK with the relatively low logic value. Thus, the pre-regulated voltage VRG is transmitted through the turned-on switch S1 to the node N1, and a ground voltage of the ground terminal GND is transmitted through the turned-on switch S3 and to the node N2. Under this condition, a voltage difference between the two terminals of the capacitor C1 is substantially equal to the pre-regulated voltage VRG.

During the time point TP2 to a time point TP3 (e.g., a second phase), the clock signal CK has the relative low logic value and the inversion clock signal ZCK has the relative high logic value. The switch S1 and the switch S3 are turned off based on the clock signal CK with the relatively low logic value, and the switch S2 and the switch S4 are turned on based on the inversion clock signal ZCK with the relatively high logic value. Thus, the tracking voltage VT from the tracking circuit 140 is transmitted to the node N2 through the turned-on switch S4, and then is coupled to the node N1 through the capacitor C1. As such, the voltage at the node N1 would be a sum of the pre-regulated voltage VRG and the tracking voltage VT, which can be transmitted to the node N3 through the turned-on switch S2, to generate the pumped voltage VP. In other words, the pumped voltage VP is substantially equal to the voltage sum of the pre-regulated voltage VRG and the tracking voltage VT. Then, the pump circuit 120 can transmit the pumped voltage VP to the control terminal of the power switch PT to turn on or turn off the power switch PT.

When the power transistor PT is turned on, a voltage difference between the pumped voltage VP at the control terminal of the power transistor PT and the output voltage VOUT at the second terminal (e.g., a source terminal) of the power transistor PT is substantially equal to the threshold voltage of the power transistor PT. When the threshold voltage of the power transistor PT and the transistor T1 are substantially equal, the pumped voltage VP is substantially equal to the voltage sum of the pre-regulated voltage VRG and the threshold voltage of the power transistor PT (i.e., the tracking voltage VT), and the output voltage VOUT can be locked at a voltage which is substantially equal to the pre-regulated voltage VRG precisely.

Figure 3:
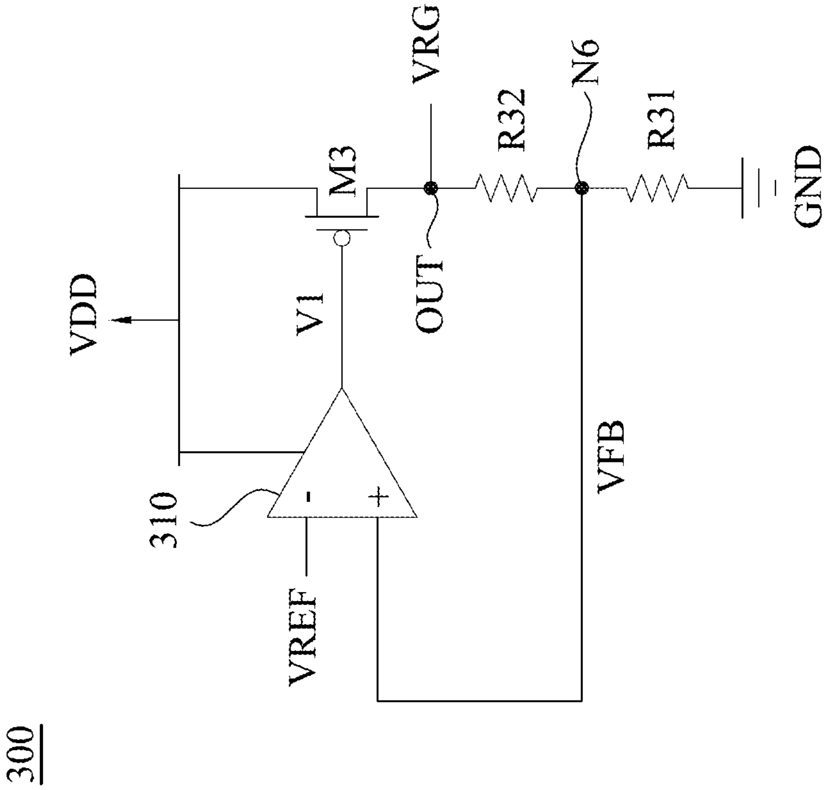
FIG. 3 is a schematic diagram illustrating a pre-regulator circuit according to some embodiments of the present disclosure.

Reference is made to FIG. 3. FIG. 3 is a schematic diagram illustrating a pre-regulator circuit 300 according to some embodiments of the present disclosure. In some embodiments, the pre-regulator circuit 110 in FIG. 1 is implemented by the pre-regulator circuit 300.

As illustrated in FIG. 3, the pre-regulator circuit 110 includes an operational amplifier 310, a transistor M3, a resistor R31, and a resistor R32. In some embodiments, the transistor M3 is implemented by a P-type transistor.

The operational amplifier 310 operates based on the power voltage VDD and includes a negative input terminal, a positive input terminal, and an output terminal. The negative input terminal of the operational amplifier 310 receives a reference voltage VREF, the positive input terminal of the operational amplifier 310 receives a feedback voltage VFB from a node N6, and the operational amplifier 310 generates a voltage V1 at its output terminal. A first terminal of the transistor M3 is configured to receive the power voltage VDD, a second terminal of the transistor M3 is coupled to an output terminal OUT, and a control terminal of the transistor M3 receives the voltage V1. The resistor R31 is coupled between the node N6 and the ground terminal GND. The resistor R32 is coupled between the output terminal OUT and the node N6. The resistor R31 and the resistor R32 form a voltage divider. The feedback voltage VFB is generated at the node N6. The pre-regulated voltage VRG is generated at the output terminal OUT.

It is noted that the implementation of the pre-regulator circuit 300 in FIG. 3 is merely for illustration, and the present disclosure is not limited thereto. Various suitable implementations of the pre-regulator circuit are within the contemplated scopes of the present disclosure.

In some related approaches, in a regulator, a charge pump is added between a power voltage and an operating amplifier to pump the power voltage such that a gate voltage of a power transistor is higher for locking an output voltage more accurately. In this structure, the charge pump introduces larger ripple.

Compared to the related approaches, since the regulator 100 is without the aforementioned charge pump between the power voltage and the operating amplifier and the pump circuit 120 in the regulator 100 is the one-stage pump circuit, the regulator 100 introduces smaller ripple. In addition, since the pumped voltage VP for controlling the power transistor PT is pumped to a higher voltage due to operations of pump circuit 120 and the tracking circuit 140, the output voltage VOUT can be locked more accurately. Moreover, since the pump circuit 120 is the one-stage pump circuit, the regulator 100 occupies a smaller circuit area. Furthermore, since the output voltage VOUT is with open-loop architecture due to the tracking mechanism of the tracking circuit 140, the regulator 100 is without stability concern and safe operating area (SOA) concern.

Figure 4:
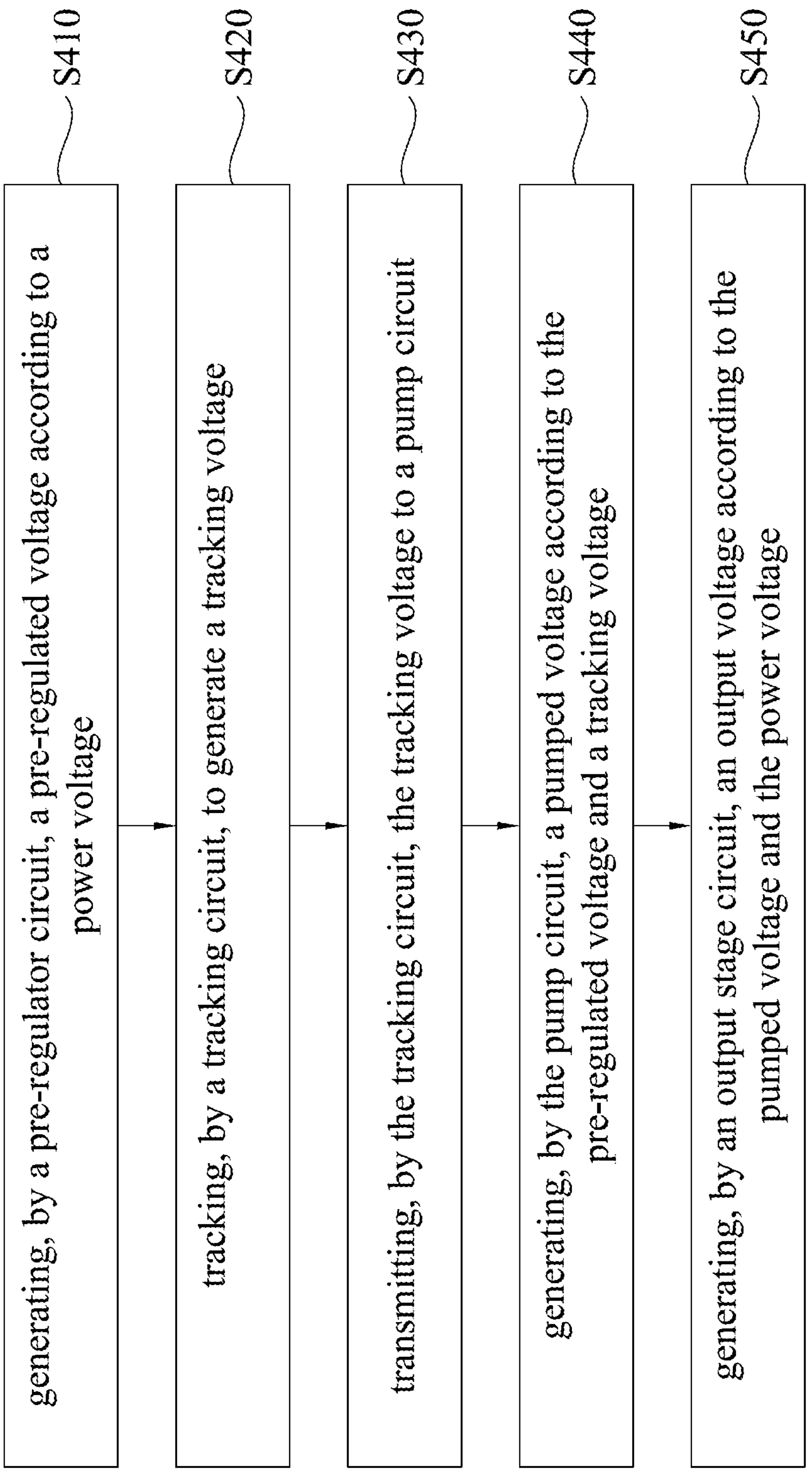
FIG. 4 is a flow diagram illustrating an operation method according to some embodiments of the present disclosure.

Reference is made to FIG. 4. FIG. 4 is a flow diagram illustrating an operation method 400 according to some embodiments of the present disclosure.

As illustrated in FIG. 4, the operation method 400 includes operation S410, operation S420, operation S430, operation S440, and operation S450.

In some embodiments, the operation method 400 can be applied to the regulator 100 in FIG. 1, but the present disclosure in not limited thereto. For better understanding, the operation method 400 is described below with reference to the regulator 100 in FIG. 1.

In operation S410, the pre-regulator circuit 110 generates the pre-regulated voltage VRG according to the power voltage VDD. In some embodiments, the pre-regulator circuit 110 converts the higher power voltage VDD into the lower pre-regulated voltage VRG.

In operation S420, the tracking circuit 140 tracks the output stage circuit 130 to generate the tracking voltage VT. In some embodiments, the tracking circuit 140 tracks the threshold voltage of the power transistor PT in the output stage circuit 130 to generate the tracking voltage VT.

In operation S430, the tracking circuit 140 transmits the tracking voltage VT to the pump circuit 120. In some embodiments, the tracking circuit 140 transmits the tracking voltage VT to control the pump circuit 120 so as to generate the higher pumped voltage VP.

In operation S440, the pump circuit 120 generates the pumped voltage VP according to the pre-regulated voltage VRG and the tracking voltage VT. In some embodiments, the pumped voltage VP is substantially equal to the voltage sum of the pre-regulated voltage VRG and the tracking voltage VT based on operations during the time point TP1 to the time point TP3 in FIG. 2.

In operation S450, the output stage circuit 130 generates the output voltage VOUT according to the pumped voltage VP and the power voltage VDD. As illustrated in FIG. 1, the pumped voltage VP is configured to control the turned-on degree of the power transistor PT to conduct the power voltage VDD so as to generate the output voltage VOUT.

Other details about operation S410, operation S420, operation S430, operation S440, and operation S430 are described in embodiments related to the regulator 100 in FIG. 1. Thus, they are not described herein again.

Based on the descriptions above, in the present disclosure, the output voltage of the regulator not only can introduce smaller ripple but also can be locked more accurately.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A regulator, comprising:

- a pre-regulator circuit configured to generate a pre-regulated voltage according to a power voltage;
- a pump circuit configured to generate a pumped voltage according to the pre-regulated voltage and a tracking voltage;
- an output stage circuit configured to generate an output voltage according to the pumped voltage and the power voltage; and
- a tracking circuit configured to track the output stage circuit to generate the tracking voltage and transmit the tracking voltage to the pump circuit,
- wherein the pump circuit comprises:
  - a first switch and a second switch coupled in series at a first node between the pre-regulator circuit and the output stage circuit;
  - a third switch and a fourth switch coupled in series at a second node between a ground terminal and the tracking circuit;
  - a capacitor coupled between the first node and the second node; and
  - an oscillator configured to output a clock signal and an inversion clock signal to control the first switch, the second switch, the third switch, and the fourth switch.

2. The regulator of claim 1, wherein the pre-regulated voltage is lower than the power voltage, wherein the pumped voltage is higher than the pre-regulated voltage.

3. The regulator of claim 1, wherein the pumped voltage is substantially equal to a voltage sum of the pre-regulated voltage and the tracking voltage.

4. The regulator of claim 1, wherein the output stage circuit comprises:

a power transistor, wherein the tracking circuit is configured to track a threshold voltage of the power transistor to generate the tracking voltage.

5. The regulator of claim 4, wherein the power transistor has the threshold voltage substantially equal to the tracking voltage, in order to track the output stage circuit.

6. The regulator of claim 1, wherein the first switch is configured to receive the pre-regulated voltage, the second switch is configured to output the pumped voltage, the third switch is directly coupled to the ground terminal, and the fourth switch is configured to receive the tracking voltage.

7. The regulator of claim 6, wherein the oscillator is configured to output the clock signal to control the first switch and the third switch, and the oscillator is configured to output the inversion clock signal to control the second switch and the fourth switch.

8. The regulator of claim 1, wherein the tracking circuit comprises:

a current source;

a first transistor coupled to the ground terminal;

a second transistor coupled between the first transistor and the current source; and a third transistor configured to receive the power voltage, coupled to the fourth switch, and controlled by a node voltage at a node between the second transistor and the current source.

9. The regulator of claim 8, wherein the first transistor and the second transistor are in a diode-connected form.

10. The regulator of claim 8, wherein the output stage circuit comprises:

a power transistor, wherein a size of the power transistor is substantially equal to a size of the first transistor.

11. The regulator of claim 8, wherein a size of the third transistor is substantially equal to a size of the second transistor.

12. An operation method of a regulator, comprising:

generating, by a pre-regulator circuit, a pre-regulated voltage according to a power voltage;

tracking, by a tracking circuit, to generate a tracking voltage;

transmitting, by the tracking circuit, the tracking voltage to a pump circuit;

generating, by the pump circuit, a pumped voltage according to the pre-regulated voltage and the tracking voltage; and generating, by an output stage circuit, an output voltage according to the pumped voltage and the power voltage, wherein generating, by the pump circuit, the pumped voltage according to the pre-regulated voltage and the tracking voltage comprises:

outputting, by an oscillator in the pump circuit, a clock signal and an inversion clock signal to control a first switch in the pump circuit, a second switch in the pump circuit, a third switch in the pump circuit, and a fourth switch in the pump circuit, wherein the first switch and the second switch are coupled in series at a first node between the pre-regulator circuit and the output stage circuit, the third switch and the fourth switch are coupled in series at a second node between a ground terminal and the tracking circuit, and a capacitor in the pump circuit is coupled between the first node and the second node.

13. The operation method of the regulator of claim 12, wherein the pre-regulated voltage is lower than the power voltage, wherein the pumped voltage is higher than the pre-regulated voltage.

14. The operation method of the regulator of claim 12, wherein the pumped voltage is substantially equal to a voltage sum of the pre-regulated voltage and the tracking voltage.

15. The operation method of the regulator of claim 12, wherein tracking, by the tracking circuit, to generate the tracking voltage comprises:

tracking, by the tracking circuit, a threshold voltage of a power transistor in the output stage circuit to generate the tracking voltage.

16. The operation method of the regulator of claim 12, wherein outputting, by the oscillator in the pump circuit, the clock signal and the inversion clock signal to control the first switch in the pump circuit, the second switch in the pump circuit, the third switch in the pump circuit, and the fourth switch in the pump circuit comprises:

outputting, by the oscillator, the clock signal to control the first switch and the third switch; and outputting, by the oscillator, the inversion clock signal to control the second switch and the fourth switch, wherein the first switch is configured to receive the pre-regulated voltage, the second switch is configured to output the pumped voltage, the third switch is directly coupled to the ground terminal, and the fourth switch is configured to receive the tracking voltage.

* * * * *